(No Model.) 2 Sheets—Sheet 2.
G. B. BOOMER.
PRESS.
No. 385,541. Patented July 3, 1888.
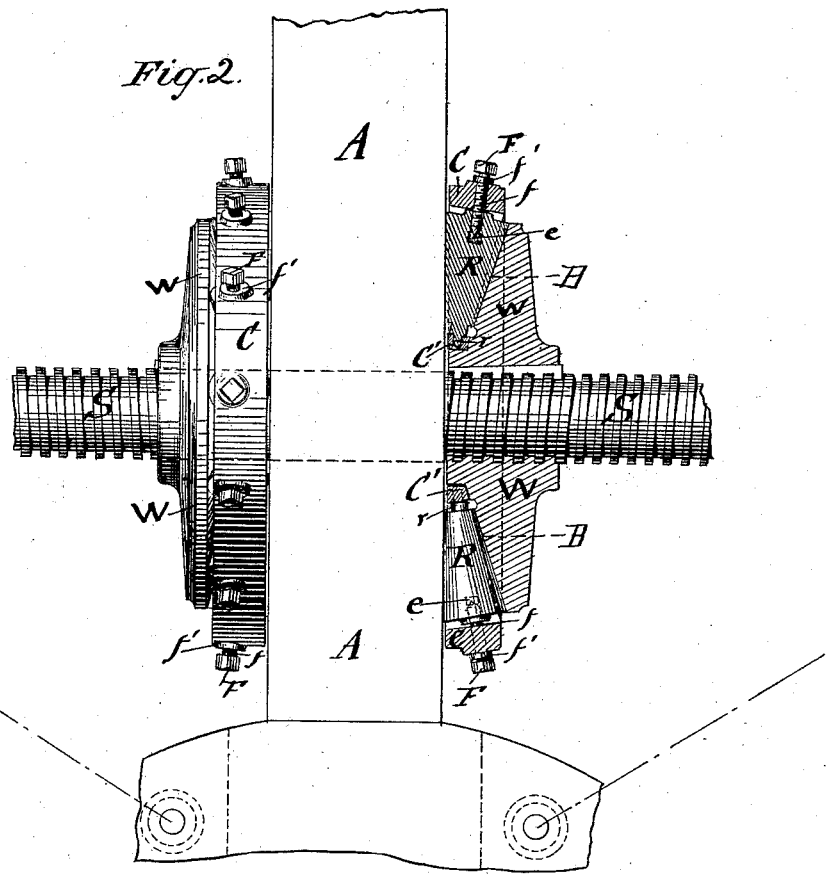
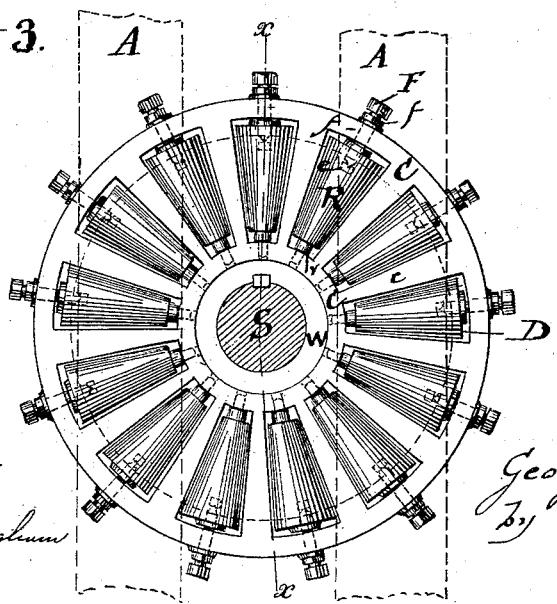
WITNESSES.
John Becker.
Fred N. Cunningham.
INVENTOR.
George B. Boomer.
by
Attorneys.

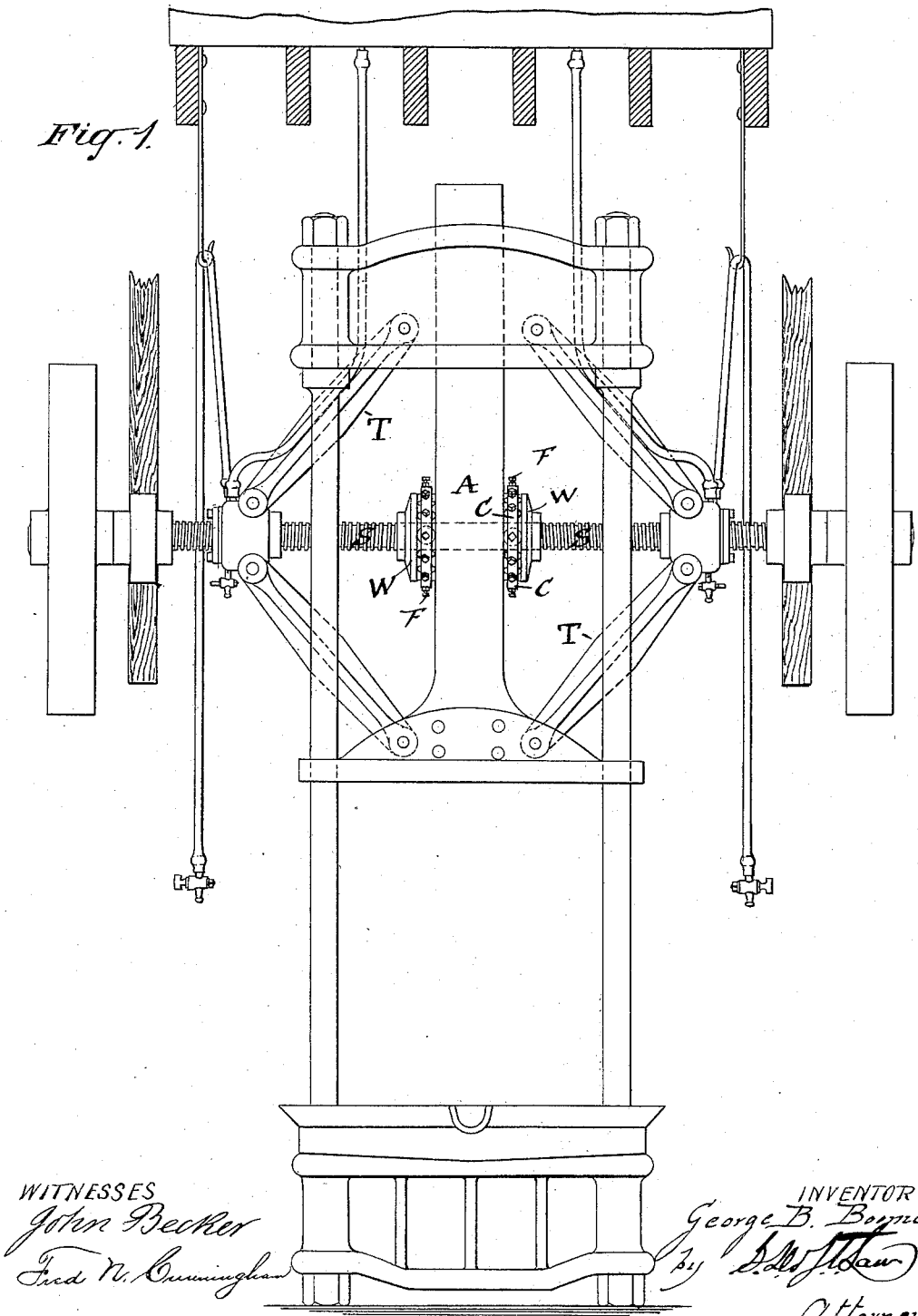

UNITED STATES PATENT OFFICE.

GEORGE B. BOOMER, OF MOUNT PLEASANT, NEW YORK.

PRESS.

SPECIFICATION forming part of Letters Patent No. 385,541, dated July 3, 1888.

Application filed June 7, 1887. Serial No. 240,501. (No model.)

*To all whom it may concern:*

Be it known that I, GEORGE B. BOOMER, of the town of Mount Pleasant, county of Westchester, State of New York, have invented a certain new and useful Improvement in Presses, of which the following is a full, clear, and exact description, reference being had to the accompanying drawings, making part of this specification.

My invention is an improvement in the knuckle-joint press invented by George B. Boomer, Thomas G. Morse, and Rufus E. Boschert, for which Letters Patent were granted November 1, 1870, and numbered 108,753, and refers to the washers on the horizontal screw which bear on the vertical standards and serve to steady the screw in the working of the press, and is designed to provide a device in connection with the washers that will serve to reduce the friction of the washers against the standards and insure the press working more smoothly, and preventing the washers from grinding into the standards.

In the drawings illustrating my improvement, in which like letters indicate like parts, Figure 1 is a view of that part of the press to which my improvement is applied. Fig. 2 is a view of the washers on the horizontal screw provided with my improvement, showing one washer in section. Fig. 3 is a plan view of my improved anti-friction rollers, showing the position of the rollers against the standards.

As will be understood from the drawings, in Fig. 1, in order to keep the lozenge formed by the toggle-levers T in a symmetrical position and prevent an endwise motion of the screw S, and retain the latter in a horizontal position, and thus insure an even action of the platen of the press, washers W are securely fastened to the horizontal screw S and arranged to bear against the vertical standards A. As the screw turns, and thus revolves the washers W secured to it, the latter press and in turning bear against the standards, and when there is an uneven distribution of the material to be pressed the washers bear with so much force on the standards as to cause a considerable friction, and in some cases wear into the surface of the standards. To overcome this friction and prevent the washers grinding or wearing into the standards, I interpose between the inner surface of the washers W and the standards A a series of rollers, R, so as to offer a revolving surface for the washers to press against as they turn with the screw. These rollers, as will be seen from the drawings, are mounted in a metallic frame or collar, C, as shown more particularly in Fig. 3. This metallic frame consists of the two rings C and C' at each end of the rollers and the cross or connecting pieces c, so constructed as to leave the wedge-shaped openings D, in which the rollers are mounted. Preferably these rings C and C' and the cross-pieces c are all cast in one piece of suitable metal, so as to form a strong frame-work for the rollers.

The frame C rests loosely in a suitable recess, B, formed in the inner surface of the washers W. This frame or collar extends from the outer edge of the washers about half-way to the center of the screw S, as shown in Fig. 2, and is wider at its outer edge, diminishing as it approaches the screw.

The rollers R, which are mounted in the openings D in the frame C, are cone-shaped, as shown in Fig. 3, and are of such a size with respect to the size of the washer that they would come to a point if extended to the center of the screw, and are constructed and set in the frame C in such a manner that when revolved by the action of the washers against the face of the standard they describe the exact circular plane of the portion of the washer against which they revolve, while at the same time they present a true plane to the surface of the standards. On the small end of the rollers R is a journal, r, which rests in a bearing formed in the ring C' in the end of the recess D, in which the rollers revolve. The large ends of the rollers revolve on a set-screw, f, which extends through the outer edge of the collar and rests in a cavity or hole in the end of the roller, as shown in Figs. 2 and 3. This set-screw f not only acts as a journal to keep the end of the roller in its true line, but also prevents it from slipping endwise from between the washers and standard, as on account of its wedge shape it is liable to do if not held in position while in operation.

The outer end of the set-screw f has a head, F, by which the screw may be screwed into and out of the frame C in order to adjust the rollers in the recess D, and is further provided with a set-nut, $f'$, between its head and the frame C, so that when properly adjusted it may be held and secured in its place by turning the nut against the frame. A small block of wood, $e$, may be placed in the end of the cavity or hole in the rollers to form a bearing for the set-screw $f$. This frame or collar C, with the rollers R mounted therein, is placed in the recess provided in the inner surface of the washer W, and the latter secured to the horizontal screw, so that the rollers R rest against the standards, as shown in Fig. 2. As the washers turn with the screw, the frame C, resting loosely in the recess therein, turns with it in the same direction as the washers, the frame making one revolution while the washers are making two, and the rollers R revolve by the pressure of the washers on one side and the standards on the other.

In operating a press provided with my improvement, the screw is constantly changing its relative position with the standards in a vertical direction; hence the plane upon which the rollers travel is constantly passing the screw. By means of these rollers, therefore, the friction of the washers on the standards is reduced, and the washers are prevented from grinding into the standards and interfering with the even motion of the screw.

As will be understood in operating the press, the conical rollers travel on the face of the vertical standards and move up and down with the screw as the latter changes its relative position with the standard; hence the construction of the frame, rollers, and washer must be such that the rollers will bear equally throughout their length on the face of the standard at any and all points over which the rollers travel. This is accomplished by cutting the recess in the washer, so that the central line of the axis of the roller will, when extended, strike the plane of the standard at the center of the screw.

I am aware that frames with conical rollers have been used to reduce friction in cases where the moving shaft maintained a constant relative position with the stationary part against which it moved, and I do not claim such construction as my invention; but

What I claim is—

In a knuckle-joint press, the combination, with the screw S, the guiding-standard A, and the washers W, of the frames C, provided with the conical rollers R, constructed and arranged so as to travel on the face of the standard, substantially as described, as and for the purposes set forth.

In testimony of which I hereto sign my name this 2d day of June, 1887.

GEO. B. BOOMER.

Witnesses:
 J. C. CLAYTON,
 JAMES T. LAW.